(12) United States Patent
Kubota et al.

(10) Patent No.: US 7,885,486 B2
(45) Date of Patent: Feb. 8, 2011

(54) IMAGE PROCESSING SYSTEM, METHOD FOR PROCESSING IMAGE AND COMPUTER READABLE MEDIUM

(75) Inventors: Satoshi Kubota, Kanagawa (JP); Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 921 days.

(21) Appl. No.: 11/806,607

(22) Filed: Jun. 1, 2007

(65) Prior Publication Data
US 2008/0025643 A1 Jan. 31, 2008

(30) Foreign Application Priority Data
Jul. 31, 2006 (JP) .............................. 2006-208589
Nov. 9, 2006 (JP) .............................. 2006-303628

(51) Int. Cl.
*G06K 9/32* (2006.01)
*G06K 9/36* (2006.01)

(52) U.S. Cl. ........................................ 382/298; 382/240

(58) Field of Classification Search ................. 382/298, 382/293, 248, 240, 197; 348/432, 433, 403.1
See application file for complete search history.

(56) References Cited

U.S. PATENT DOCUMENTS

| | | | |
|---|---|---|---|
| 5,911,007 A | 6/1999 | Miyake | |
| 6,473,533 B1 * | 10/2002 | Yokose et al. | 382/248 |
| 6,728,406 B1 | 4/2004 | Murao | |
| 7,228,000 B2 * | 6/2007 | Sakuyama | 382/240 |
| 7,356,190 B2 * | 4/2008 | Mizoguchi et al. | 382/233 |
| 7,492,951 B2 * | 2/2009 | Yagishita et al. | 382/232 |
| 2003/0179935 A1 | 9/2003 | Kubota | |

FOREIGN PATENT DOCUMENTS

| | | |
|---|---|---|
| JP | A 2001-092973 | 4/2001 |
| JP | B2 3195142 | 6/2001 |
| JP | B2 3302731 | 4/2002 |
| JP | B2 3404138 | 2/2003 |
| JP | A 2003-274154 | 9/2003 |
| JP | B2 3915563 | 2/2007 |

* cited by examiner

*Primary Examiner*—Yon Couso
(74) *Attorney, Agent, or Firm*—Oliff & Berridge, PLC

(57) ABSTRACT

An image processing system includes a frequency conversion section, a frequency component generation section, an enlarged image area generation section and an enlarged image generation section. The frequency conversion section converts neighboring areas of each area in question into plural frequency components. The areas in question and the neighboring areas of the areas in question are included in an input image. The frequency component generation section generates predetermined frequency components from the frequency components of each neighboring area. The enlarged image area generation section generates an enlarged image area for each area in question, using (i) an image region which contains each area in question and which has a predetermined size and (ii) the predetermined frequency components. The enlarged image generation section places the enlarged image areas to generate an enlarged image for the input image.

24 Claims, 18 Drawing Sheets

WAVELET TRANSFORM

BLOCK IN QUESTION

FIG. 7A
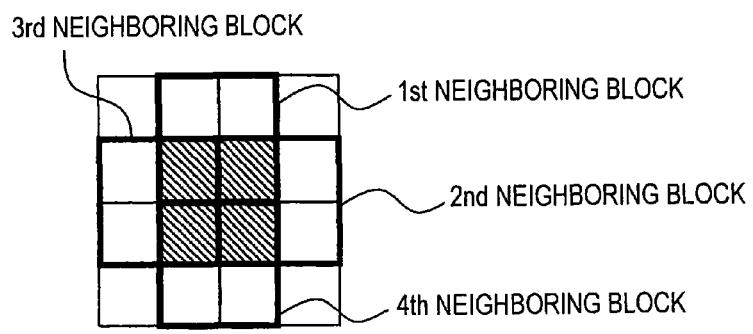
3rd NEIGHBORING BLOCK
1st NEIGHBORING BLOCK
2nd NEIGHBORING BLOCK
4th NEIGHBORING BLOCK
FIG. 7B
1st NEIGHBORING BLOCK
2nd NEIGHBORING BLOCK
3rd NEIGHBORING BLOCK
4th NEIGHBORING BLOCK
FIG. 8A          FIG. 8
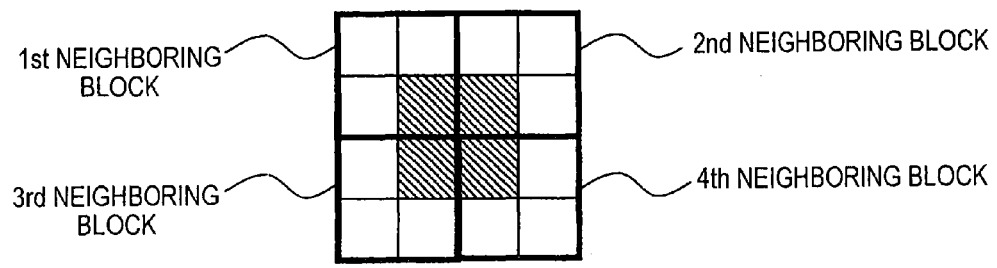
INVERSE WAVELET TRANSFORM

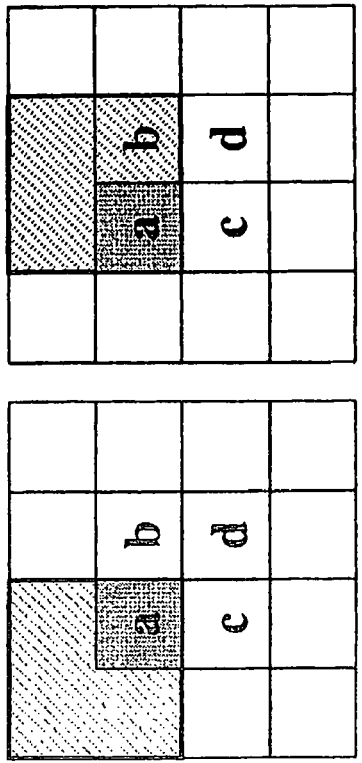
FIG. 16A  POSITION 0
FIG. 16B  POSITION 1
FIG. 16C  POSITION 2
FIG. 16D  POSITION 3

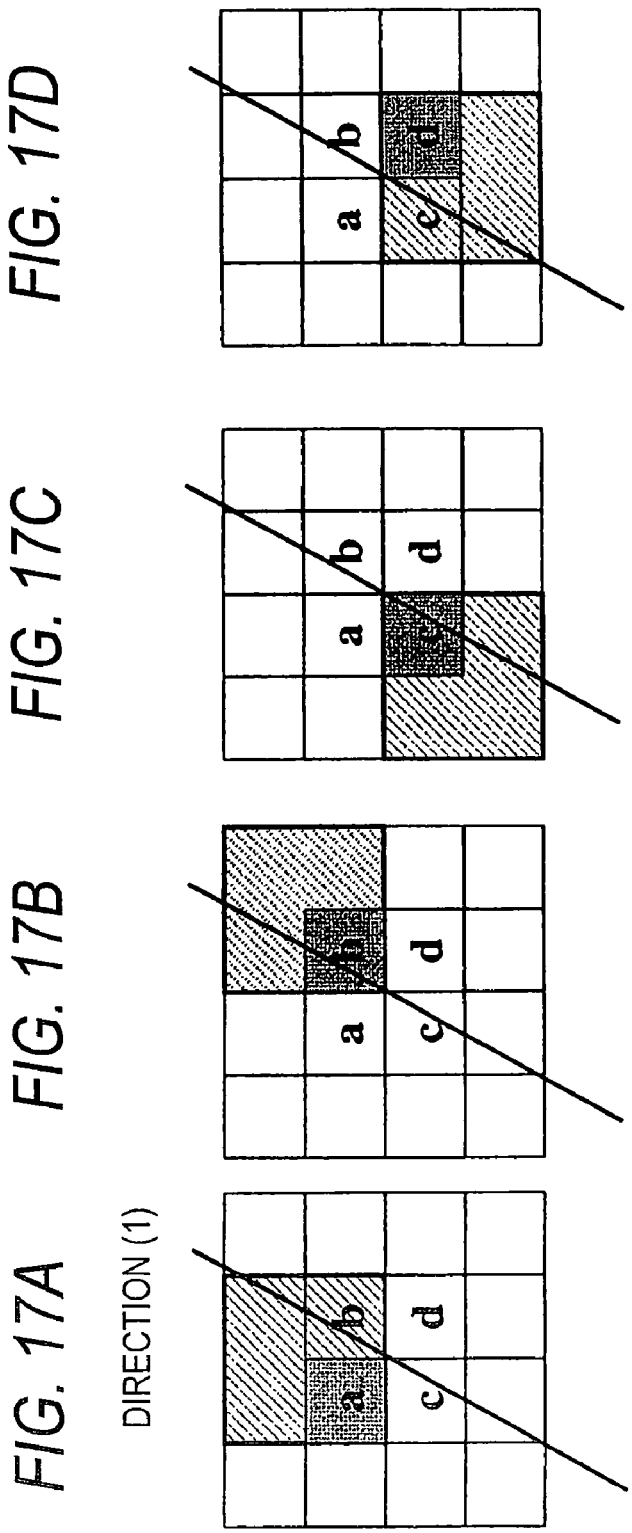

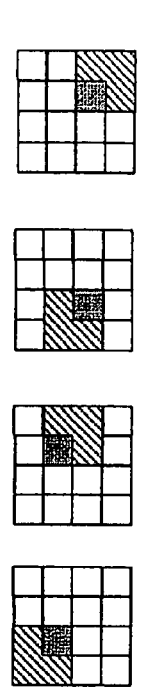

FIG. 18A EXAMPLES OF A REFERENCE BLOCK PATTERN IN DIRECTION (1)

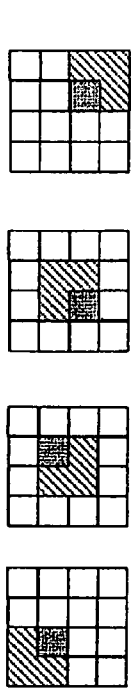

FIG. 18B EXAMPLES OF A REFERENCE BLOCK PATTERN IN DIRECTION (2)

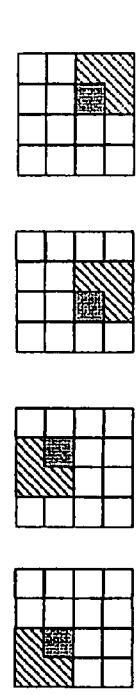

FIG. 18C EXAMPLES OF A REFERENCE BLOCK PATTERN IN DIRECTION (3)

FIG. 18D EXAMPLES OF A REFERENCE BLOCK PATTERN IN DIRECTION (4)

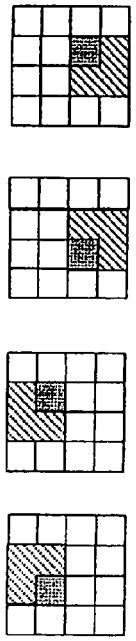

FIG. 18E EXAMPLES OF A REFERENCE BLOCK PATTERN IN DIRECTION (5)

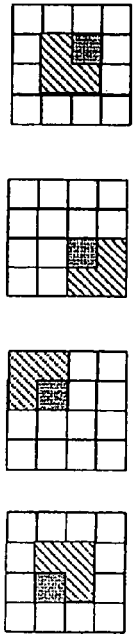

FIG. 18F EXAMPLES OF A REFERENCE BLOCK PATTERN IN DIRECTION (6)

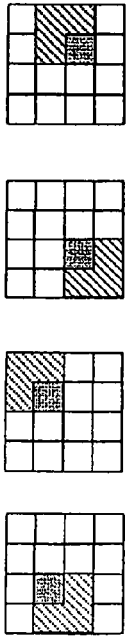

FIG. 18G EXAMPLES OF A REFERENCE BLOCK PATTERN IN DIRECTION (7)

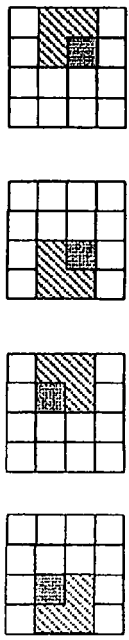

FIG. 19A

| i00 | i01 | i02 |
|---|---|---|
| i10 | i11 | i12 |
| i20 | i21 | i22 |

3 × 3 IMAGE BLOCK

FIG. 19B

| i00 | i01 | i11 |
|---|---|---|
| | i10 | |

NEIGHBORING BLOCK 0

FIG. 19C

| i01 | i02 |
|---|---|
| i11 | i12 |

NEIGHBORING BLOCK 1

FIG. 19D

| i10 | i11 |
|---|---|
| i20 | i21 |

NEIGHBORING BLOCK 2

FIG. 19E

| i11 | i12 |
|---|---|
| i21 | i22 |

NEIGHBORING BLOCK 3

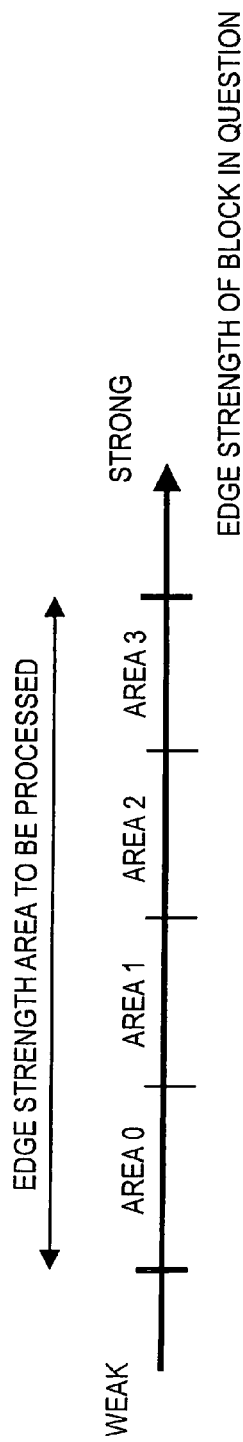
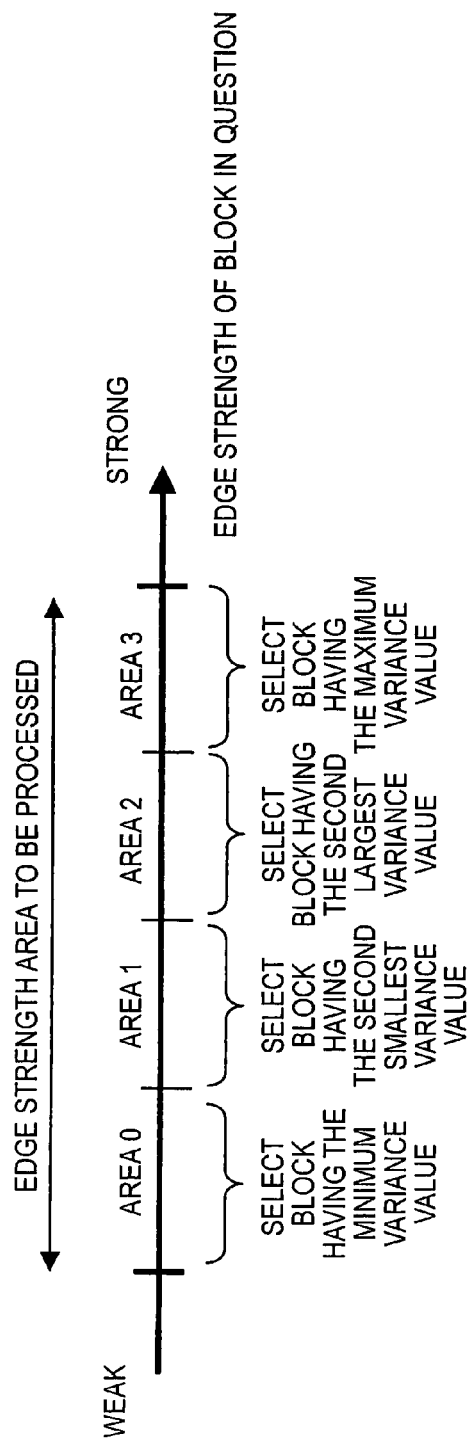
FIG. 20A
FIG. 20B

IMAGE PROCESSING SYSTEM, METHOD FOR PROCESSING IMAGE AND COMPUTER READABLE MEDIUM

CROSS-REFERENCE TO RELATED APPLICATIONS

This application is based on and claims priority under 35 U.S.C. §119 from Japanese Patent Application No. 2006-208589 filed on Jul. 31, 2006 and Japanese Patent Application No. 2006-303628 filed on Nov. 9, 2006.

1. TECHNICAL FIELD

This invention relates to an image processing system, a method for processing an image and a computer readable medium.

2. RELATED ART

The image enlargement process is one of the basic processes for a system for editing, filing, displaying, printing, etc., an image. In recent years, image data mainly intended to be displayed with display resolution such as an image on a home page of the Internet and digital video has becomes widespread. As a result, low-resolution images are often printed on a high-resolution printer, etc. At the printing time on the printer, providing the output result of high image quality is desired, and significance of the enlargement process for providing high image quality increases.

The nearest neighbor method, the linear interpolation method, the cubic convolution method, etc., are available as a representative known technique for performing the enlargement process for an image which contains colors and is represented in multiple tones (hereinafter, such a image will be referred to as a "multilevel image"). The nearest neighbor method is a method of using, as each pixel value after enlargement, a pixel value of a pixel at the nearest distance when the pixel is inversely mapped onto the image. This method can be executed at high speed because the computing amount is small. However, one pixel of an original image is enlarged to a rectangle as it is. Thus, if a pixel value difference between adjacent pixels is small, the degree of image quality degradation is small and almost no adverse effect is produced. However, if the pixel value difference is large, the degree of image quality degradation is large as jaggies on a slanting line part and an edge part are conspicuous and the image becomes like a mosaic if the magnification ratio is large.

The linear interpolation method is a method of assuming that the pixel values between pixels changes linearly and linearly interpolating pixel values of four neighboring pixels of a point onto which a pixel after enlargement is inversely mapped to find the pixel value. In this method, although processing is heavier than the nearest neighbor method, the computing amount is comparatively small and jaggies, etc., are hard to occur. On the other hand, this method has a disadvantage that the whole image becomes blurred centering on an edge portion, which does not fall into the assumption that the pixels change linearly.

The cubic convolution method is a method of defining an interpolation function approximating a sinc function ($sin(x)/x$) based on the sampling theorem and performing convolution of 16 neighboring pixels of a point onto which a pixel after enlargement is inversely mapped (four pixels in each of X and Y directions) and the above-mentioned approximate interpolation function, to thereby find the pixel value after the enlargement. This method provides comparatively good image quality as compared with the two methods described above. However, this method also has the disadvantages that as the magnification ratio becomes large, jaggies occur in the edge portion and the high tone is emphasized. As a result, the noise component is emphasized.

SUMMARY

According to an aspect of the invention, an image processing system includes a frequency conversion section, a frequency component generation section, an enlarged image area generation section and an enlarged image generation section. The frequency conversion section converts neighboring areas of each area in question into plural frequency components. The areas in question and the neighboring areas of the areas in question are included in an input image. The frequency component generation section generates predetermined frequency components from the frequency components of each neighboring area obtained by the frequency conversion section. The enlarged image area generation section generates an enlarged image area for each area in question, using (i) an image region which contains each area in question and which has a predetermined size and (ii) the predetermined frequency components generated by the frequency component generation section. The enlarged image generation section places the enlarged image areas generated by the enlarged image area generation section to generate an enlarged image for the input image.

BRIEF DESCRIPTION OF THE DRAWINGS

Exemplary embodiments of the invention will be described in detail below with reference to the accompanying drawings, wherein:

FIGS. 7A-7B is an explanatory view showing a method of selecting a neighboring block by the high frequency component generation section;

FIGS. 8A and 8 is an explanatory view showing a process example by an image block inverse orthogonal transformation section;

FIGS. 16A-16D is an explanatory view showing a specific example of selecting a neighboring block based on the edge angle of the block in question;

FIGS. 17A-17D is an explanatory view showing an example of a reference block pattern;

FIGS. 18A-18G is an explanatory view showing specific examples of reference block patterns;

FIGS. 19A-19E is an explanatory view showing examples of a pixel in question of a block in question and neighboring blocks;

FIGS. 20A-20B is an explanatory view showing an example wherein an edge strength area of the block in question to be processed is divided into four areas based on an edge strength E.

DETAILED DESCRIPTION

Techniques of exemplary embodiments of the invention relate to an image processing for performing an enlargement process for an image represented in multiple tones containing color and in particular to an image processing for performing the enlargement process with high image quality and moreover with light processing load and producing image quality defects such as blurring and jaggies in an input image as less as possible.

First Exemplary Embodiment

Figure 1:
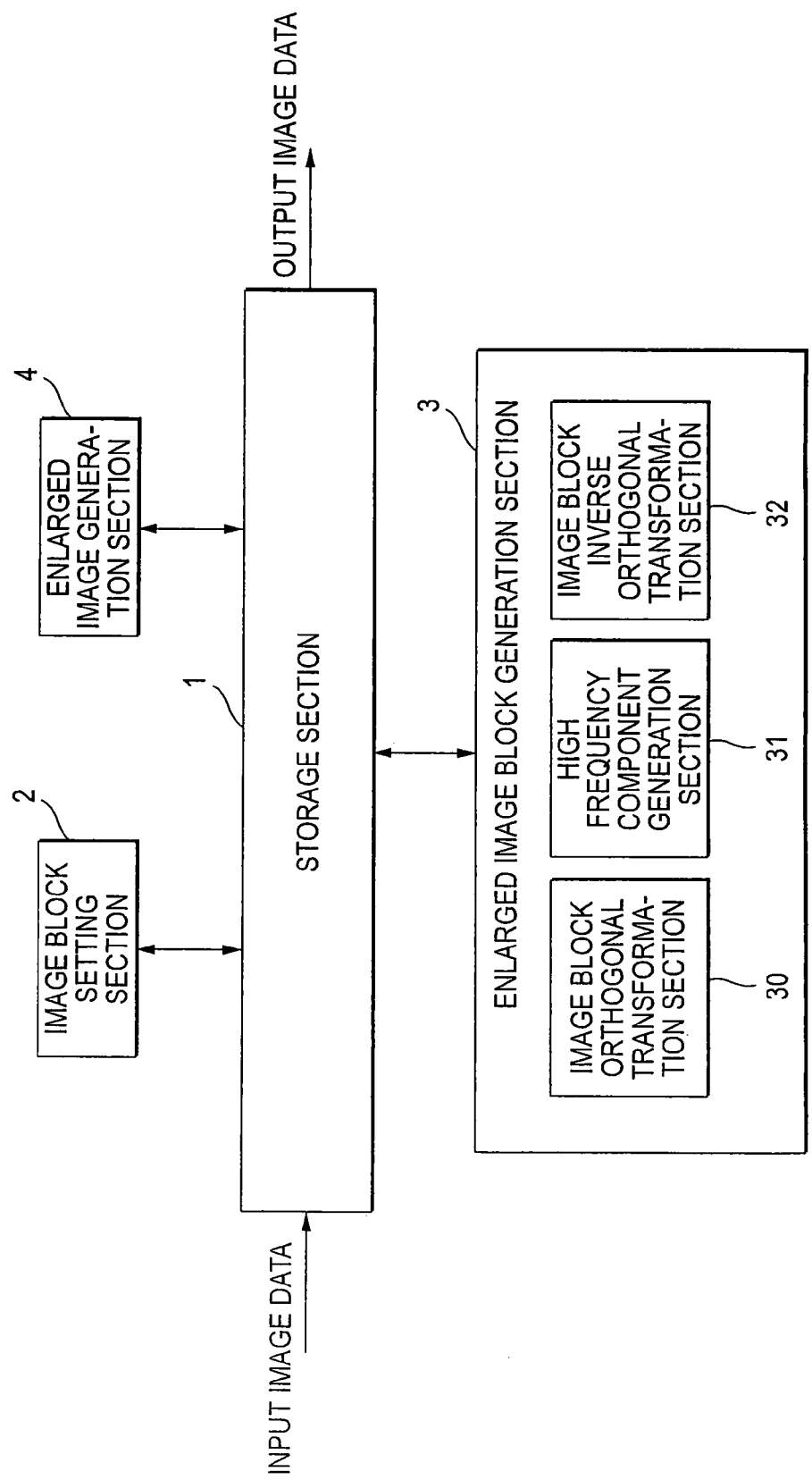
FIG. 1 is a block diagram showing one configuration example of an image processing system and an image processing method according to a first exemplary embodiment.

FIG. 1 is a block diagram showing an image processing system and an image processing method of a first exemplary embodiment. In FIG. 1, numeral 1 denotes a storage section, numeral 2 denotes an image block setting section, numeral 3 denotes an enlarged image block generation section, and numeral 4 denotes an enlarged image generation section. Further, numeral 30 denotes an image block orthogonal transformation section, numeral 31 denotes a high frequency component generation section, and numeral 32 denotes an image block inverse orthogonal transformation section.

The storage section 1 has a function of temporarily storing image data until an enlargement process is executed for the image data, a function of temporarily storing enlarged image data subjected to resolution conversion or the enlargement process until the enlarged image data is output to an output unit (not shown), etc. The image data is data described in an image format that can be processed in the image processing system (for example, BMP, TIFF, PNG, etc.), and is image data input by a digital camera, a scanner, etc., (not shown) or created by an application program that performs creation processing, edit processing, etc., on a personal computer, etc. The enlarged image data is also data in a similar format.

The image block setting section 2 sets respective predetermined image block sizes required for processes in the enlarged image block generation section 3, extracts image blocks having the setup block size in order (for example, in the raster scan order) from the input image data stored in the storage section 1, and outputs the image blocks having the block size.

The enlarged image block generation section 3 executes orthogonal transformation for each block in question having the predetermined size contained in the image block output from the image block setting section 2 and plural neighboring blocks having the same size in the proximity of each block in question to extract plural high frequency components, and executes inverse orthogonal transformation using each block in question and the plural high frequency components, to thereby generate an enlarged image block for each block in question.

The enlarged image block generation section 3 will be described in detail later.

The enlarged image generation section 4 places the enlarged image blocks generated by the enlarged image block generation section 3 in order and outputs the enlarged image data subjected to resolution conversion or the enlargement process to the storage section 1. Although the method of placing the enlarged image blocks will be described later, the enlarged image blocks may be placed in order so that the enlarged image blocks overlap each other and that a sum total of the overlapping pixel values may be divided by the number of the overlapping pixels, to thereby calculate the pixel values in addition to a method of placing arranging the enlarged image blocks in order, for example.

[Detailed Description of Enlarged Image Block Generation Section]

Figure 2:
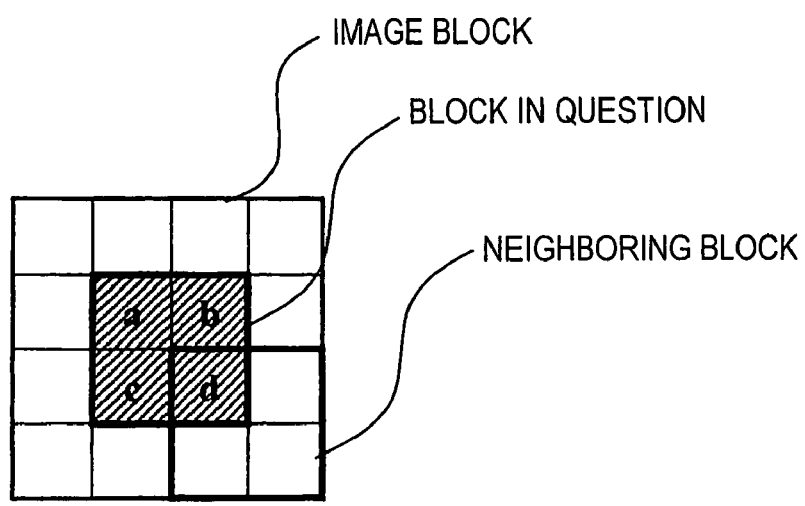
FIG. 2 is an explanatory view showing one example of an image block containing a block in question and neighboring blocks.

Next, the enlarged image block generation section 3 will be described in more detail. The enlarged image block generation section 3 includes the image block orthogonal transformation section 30, the high frequency component generation section 31, and the image block inverse orthogonal transformation section 32 as shown in FIG. 1. In the following description, the case where each of the block in question and the neighboring blocks is 2×2 pixel size blocks, and an image block containing the block in question and the neighboring blocks is a 4×4 pixel size block as illustrated in FIG. 2 is taken as a specific example.

The image block orthogonal transformation section 30 executes the wavelet transform using a Haar wavelet shown in the following expression (1) for the block in question and the neighboring blocks in the image block output from the image block setting section 2, to break down the block in question and the neighboring block into sub-band components LL, LH, HL, and HH.

$$LL=(a+c+b+d)/4$$

$$LH=(a+b-c-d)/4$$

$$HL=(a-b+c-d)/4$$

$$HH=(a-b-c+d)/4 \qquad (1)$$

Figure 3:
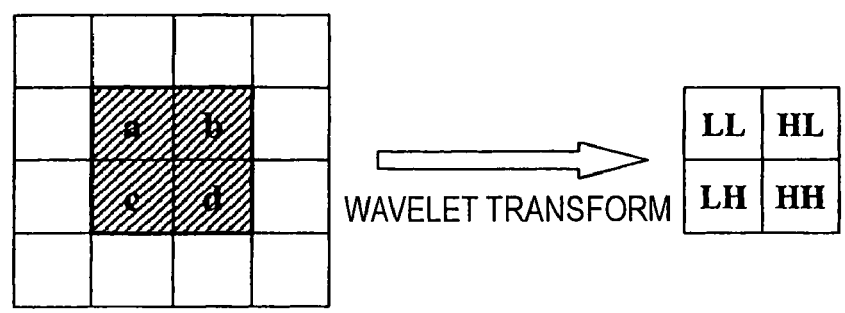
FIG. 3 is explanatory view showing one example of a pixel value of each pixel in a block in question or a neighboring block.

In this expression, a, b, c and d denote pixel values of the pixels in each block in question or each neighboring block as illustrated in FIG. 3.

The orthogonal transformation in the image block orthogonal transformation section 30 is not limited to the wavelet transform using the Haar wavelet, but may be any transformation of breaking down the image block in the real space area into sub-band components.

Figure 4:
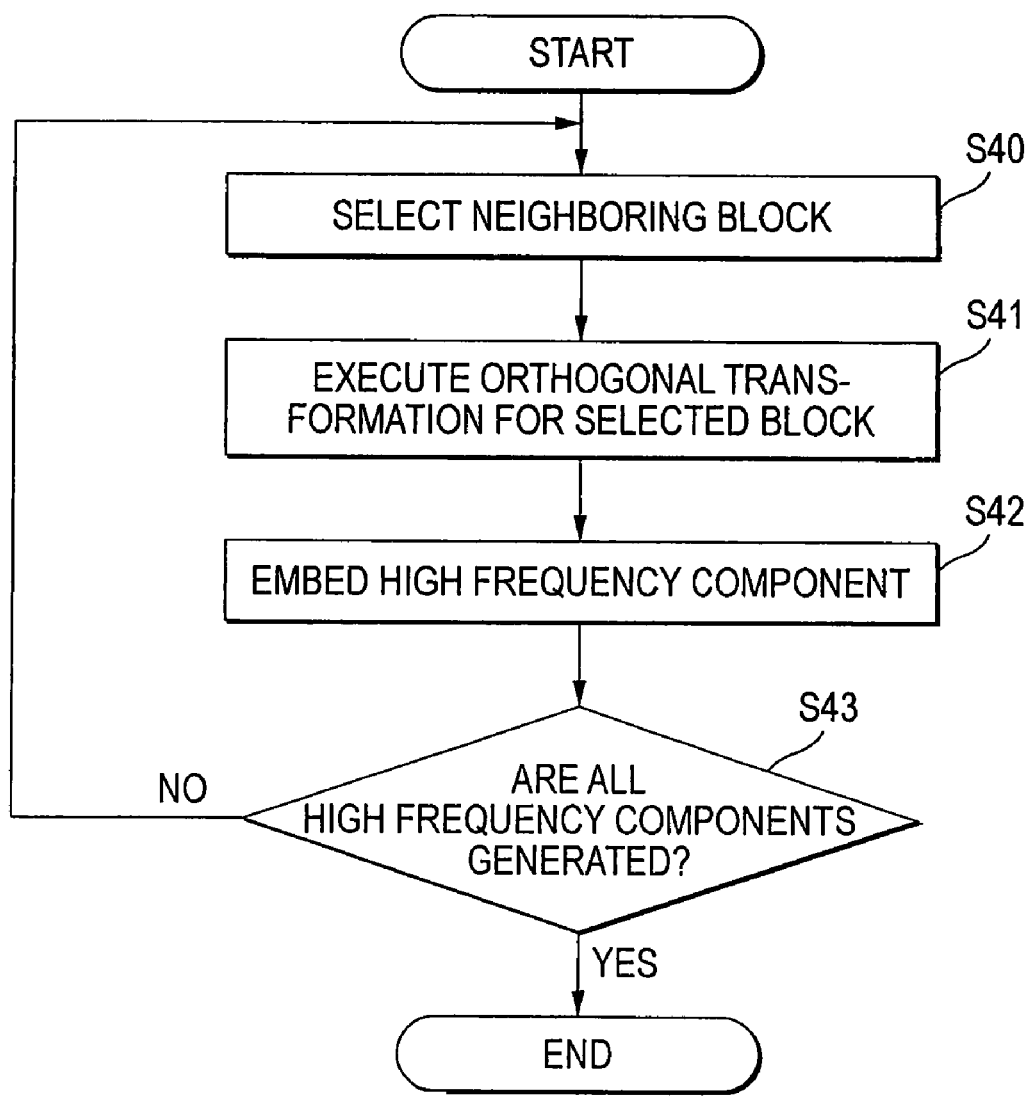
FIG. 4 is a flowchart of an example of a process of generating high frequency components of the block in question by a high frequency component generation section.

The high frequency component generation section 31 generates values which correspond to the high frequency components of the block in question and which are required in the image block inverse orthogonal transformation section 32. FIG. 4 is a flowchart of high a process of generating the frequency components of the block in question executed by the high frequency component generation section 31. FIG. 5 is a drawing to show a specific example of the process of generating the high frequency components of the block in question executed by the high frequency component generation section 31.

Figure 5A:
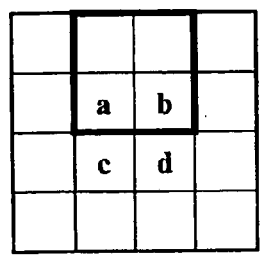
FIGS. 5A-5D is an explanatory view showing a specific example of the process of generating the high frequency components of the block in question by the high frequency component generation section.

As shown in FIG. 4, at step S40, the high frequency component generation section 31 first selects a neighboring block in the proximity of the block in question as shown in FIG. 5A.

Figure 5B:
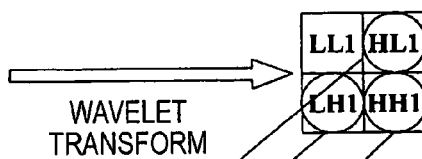

At step S41, the high frequency component generation section 31 outputs the selected neighboring block to the image block orthogonal transformation section 30, which then breaks down the neighboring block into sub-band components LL1, LH1, HL1, and HH1 as shown in FIG. 5B using the expression (1) described above.

Figure 5C:
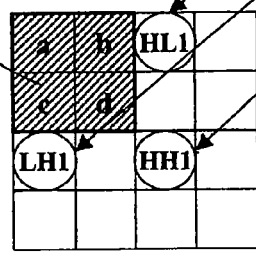
Figure 5D:
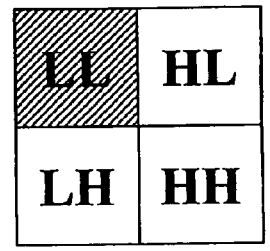

At step S42, the high frequency component generation section 31 assumes that LH1, HL1, and HH1 representing the high frequency components among the sub-band components of the neighboring block as shown in FIG. 5C are elements at predetermined positions that form sub-band components LH, HL, and HH as shown in FIG. 5D when the block in question (pixel values a, b, c, and d) is assumed to be an element forming sub-band component LL representing the low-frequency component in multiple resolution analysis, and embeds the values of LH1, HL1, and HH1.

At step S43, the high frequency component generation section 31 determines as to whether or not all the remaining elements making up the sub-band components LH, HL, and HH as shown in FIG. 5C have been generated. When all high frequency components have been generated, the process is completed. If generation of the high frequency components is not completed, steps S40 to S42 are repeated.

Figure 6:
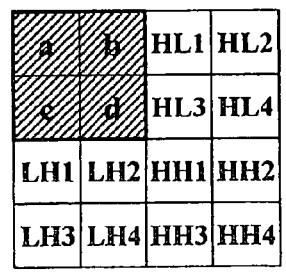
FIG. 6 is an explanatory view showing a specific example of four sets of high frequency components corresponding to a block in question.

As described above, the high frequency component generation section 31 selects four neighboring blocks by performing the processing at steps S40 to S43, and finally generates four sets of high frequency components [LH1, HL1, HH1], [LH2, HL2, HH2], [LH3, HL3, HH3], and [LH4, HL4, HH4] corresponding to each block in question as illustrated in FIG. 6.

If pixel value change in a block in question is very small and is flat (if the block in question contains almost no high frequency component) such as the case where all values of |LH0|, |HL0| and |HH0| which are absolute values of the sub-band components LH0, HL0, and HH0 of the block in question, are smaller than a predetermined threshold value Th1, the high frequency component generation section 31 may perform such a process of setting 0 to all high frequency components [LH1, HL1, HH1], [LH2, HL2, HH2], [LH3, HL3, HH3], and [LH4, HL4, HH4] without performing the process of generating the high frequency components at steps S40 to S43 described above.

The method of selecting the neighboring blocks by the high frequency component generation section 31 will be described.

As the method for selecting the neighboring blocks by the high frequency component generation section 31, a method of previously determining neighboring blocks regardless of a feature of the block in question may be adopted, for example. For example, the method may select the block just above the block in question as a first neighboring block, the block at the right of the block in question as a second neighboring block, the block at the left of the block in question as a third neighboring block, and the block just below the block in question as a fourth neighboring block as shown in FIG. 7A. Alternatively, the method may selects the block containing the upper left part of the block in question as a first neighboring block, the block containing the upper right part of the block in question as a second neighboring block, the lower left part of the block in question as a third neighboring block, and the block containing the lower right part of the block in question as a fourth neighboring block as shown in FIG. 7B.

A dynamic selection method may also be adopted, which calculates an edge angle Θ using the sub-band components LH0 and HL0 of the block in question according to the following expression (2) and selects four neighboring blocks based on the calculated edge angle Θ of the block in question.

$$\Theta = \arctan(LH0/HL0) \quad (2)$$

A specific example of the neighboring block selection based on the edge angle Θ of the block in question will be described with reference to FIGS. 15, 16, and 17.

Figure 15:
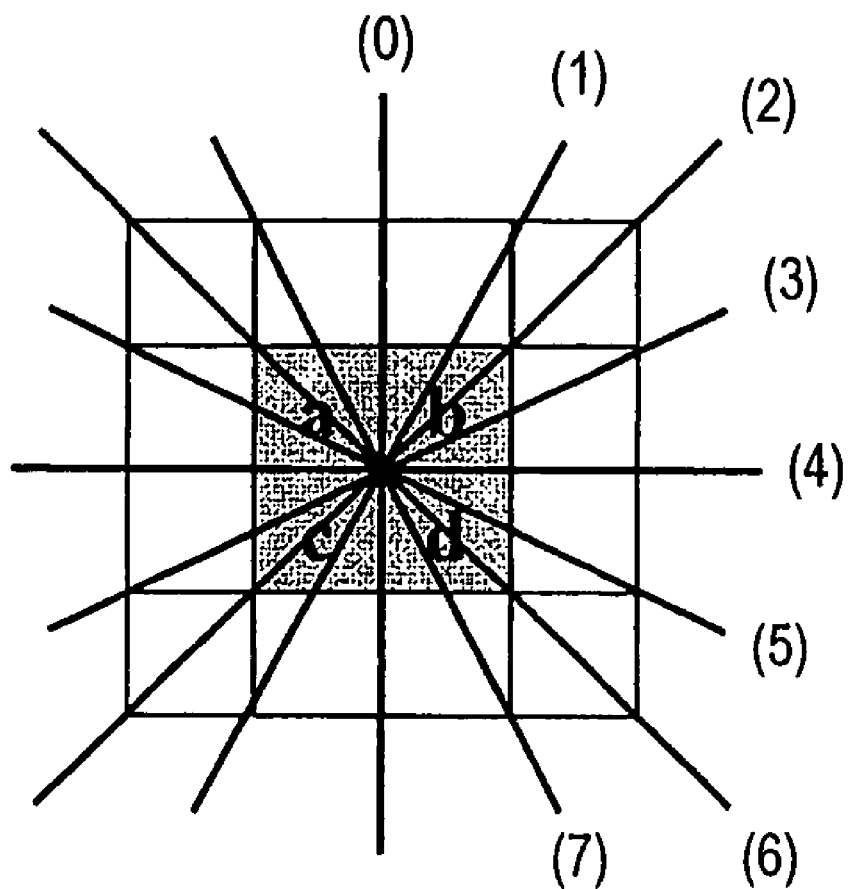
FIG. 15 is an explanatory view showing specific examples of edge angles of a block in question.

The edge angle Θ of the block in question calculated according to expression (2) is normalized in eight directions provided by partitioning at every 22.5° as shown in FIG. 15, for example. In the example, an angle range of the edge angle Θ with 0° or ±180° being at its center is set as "direction (0);" an angle range of the edge angle Θ with 22.5° or −157.5° being at its center is set as "direction (1);" an angle range of the edge angle Θ with 45° or −135° being at its center is set as "direction (2);" an angle range of the edge angle Θ with 67.5° or −112.5° being at its center is set as "direction (3);" an angle range of the edge angle Θ with 90° or −90° being at its center is set as "direction (4);" an angle range of the edge angle Θ with 112.5° or −67.5° being at its center is set as "direction (5);" an angle range of the edge angle Θ with 135° or −45° being at its center is set as "direction (6);" and an angle range of the edge angle Θ with 157.5° or −22.5° being at its center is set as "direction (7)." Each of the angle ranges is the range of ±11.25° from its center.

The dynamic selection of the neighboring blocks based on the normalized edge angle Θ mentioned above is to previously determine one neighboring block estimated to have a feature similar to the block in question (in this example, edge angle Θ) with respect to the pixel a in the block in question shown in FIG. 16, based on the edge angle Θ of the block in question from among candidate blocks at four positions (positions 0, 1, 2, and 3) in FIGS. 16A, 16B, 16C, and 16D, which are neighboring block selection candidates containing the pixel a of the block in question in the 4×4 image block.

For each of the other pixels b, c, and d of the block in question, like the pixel a, one neighboring block estimated to have a feature similar to the block in question is previously determined based on the edge angle Θ of the block in question.

That is, the position of the neighboring block to be selected for each pixel (pixel a, b, c, d) based on the edge angle Θ of the block in question is prepared as "reference block pattern." Thereby, it is made possible to dynamically select, based on the edge angle Θ, the neighboring blocks used in generating the high frequency component by the high frequency component generation section 31.

As a specific example, FIG. 17 shows one example of the "reference block pattern" representing the positions of the neighboring blocks to be selected for edge angle "direction (1)" of the block in question. In FIG. 17, each hatched 2×2 image block indicates the neighboring block used in generating the high frequency components for each pixel.

For the pixel a of the block in question, in FIG. 17A, the neighboring block to be selected is an image block at the position 1 shown in FIG. 16B. Likewise, for the pixel b of the block in question, in FIG. 17B, the neighboring block to be selected is an image block at the position 1 shown in FIG. 16B. For the pixel c of the block in question, in FIG. 17C, the neighboring block to be selected is an image block at the position 2 shown in FIG. 16C. Further, for the pixel d of the block in question, in FIG. 17D, the neighboring block to be selected is an image block at the position 2 shown in FIG. 16C like the pixel c.

That is, in the specific example shown in FIG. 17, the "reference block pattern" representing the positions of the neighboring blocks to be selected for the pixels (a, b, c, and d) of the block in question having the edge angle "direction (1)" becomes "position 1, position 1, position 2, position 2."

FIG. 18 shows specific examples of the "reference block patterns" when the edge angle of the block in question is different from "direction (1)."

FIG. 18A shows that the edge angle of the block in question is "direction (0)" and the "reference block pattern" is "position 1, position 0, position 3, position 2."

FIG. 18B shows that the edge angle of the block in question is "direction (2)" and the "reference block pattern" is "position 3, position 1, position 2, position 0."

FIG. 18C shows that the edge angle of the block in question is "direction (3)" and the "reference block pattern" is "position 2, position 1, position 2, position 1."

FIG. 18D shows that the edge angle of the block in question is "direction (4)" and the "reference block pattern" is "position 2, position 3, position 0, position 1."

FIG. 18E shows that the edge angle of the block in question is "direction (5)" and the "reference block pattern" is "position 0, position 3, position 0, position 3."

FIG. 18F shows that the edge angle of the block in question is "direction (6)" and the "reference block pattern" is "position 0, position 2, position 1, position 3."

FIG. 18G shows that the edge angle of the block in question is "direction (7)" and the "reference block pattern" is "position 0, position 0, position 3, position 3."

Of course, the "reference block patterns" based on the edge angle of the block in question are not limited to the specific examples shown in FIGS. 17 and 18. The "reference block pattern" for each edge angle may be changed appropriately in response to the type of input image data (for example, landscape image, personal image, still image, etc.,) or the image format (for example, BMP, JPEG, TIFF).

As another method for selecting the neighboring blocks, the sub-band components LH0, HL0, and HH0 representing the high frequency components of the block in question are used to calculate similarity Δ between a neighboring block and the block in question according to the following expression (3).

$$dx = |HL0 - HLx|$$

$$dy = |LH0 - LHx|$$

$$dd = |HH0 - HHx|$$

$$\Delta = dx + dy + dd \quad (3)$$

Here, HLx, LHx, and HHx are sub-band components of the selected neighboring block. A method of selecting a neighboring block having the similarity Δ smaller than a predetermined value Th0 as a similar neighboring block may be adopted. In this case, however, four similar neighboring blocks do not necessarily exist in the image block. Therefore, the neighboring blocks are selected in the ascending order of the values of the similarity Δ.

As still another method for selecting the neighboring block, a selection method based on a value corresponding to the statistic of each neighboring block may also be adopted.

FIG. 19A illustrates an image block (3×3 size block) required as a selection area from which selected is a neighboring block used in generating high frequency components of a certain pixel in the block in question (2×2 size block) such as a pixel a in question of an area in question (a, b, c, d) shown in FIG. 16. In the example shown in FIG. 19, the pixel in question is pixel i11. It is assumed that i00, ..., i22 represent pixels and pixel values thereof.

The high frequency component generation section 31 calculates an average value 'mean' of the 3×3 image block (i00, ..., i22) shown in FIG. 19A and ver0, ver1, ver2 and ver3, which are values corresponding to variances in a neighboring block 0 (i00, i01, i10, i11), a neighboring block 1 (i01, i02, i11, i12), a neighboring block 2 (i10, i11, i20, i21), and a neighboring block 3 (i11, i12, i21, i22) shown in FIGS. 19B to 19E according to the following expression (4).

$$\text{Mean} = (i00 + i01 + i02 + i10 + i11 + i12 + i20 + i21 + i22)/9$$

$$\text{ver0} = |i00 - \text{mean}| + |i01 - \text{mean}| + |i10 - \text{mean}| + |i11 - \text{mean}|$$

$$\text{ver1} = |i01 - \text{mean}| + |i02 - \text{mean}| + |i11 - \text{mean}| + |i12 - \text{mean}|$$

$$\text{ver2} = |i10 - \text{mean}| + |i11 - \text{mean}| + |i20 - \text{mean}| + |i21 - \text{mean}|$$

$$\text{ver3} = |i11 - \text{mean}| + |i12 - \text{mean}| + |i21 - \text{mean}| + |i22 - \text{mean}| \quad (4)$$

Next, the high frequency component generation section 31 may adopt a method of searching the values ver0, ver1, ver2, and ver3 corresponding to variances calculated according to expression (4) for the minimum value and selecting the neighboring block having the minimum value vermin as the neighboring block used in generating the high frequency components. By selecting the block corresponding to the minimum value as mentioned above, it is made possible for the high frequency component generation section 31 to execute stable high frequency component generation with small failure.

Here, the statistic used in selecting the neighboring block is not limited to that calculated according to the calculation expression shown as expression (4). Any calculation expression may be used so long as it is a calculation expression capable of calculating the values corresponding to variations in the neighboring blocks shown in FIG. 19B to 19E. For example, the calculation expression may be the following expression (5), of course:

$$\text{ver0} = (i00 - \text{mean})^2 + (i01 - \text{mean})^2 + (i10 - \text{mean})^2 + (i11 - \text{mean})^2$$

$$\text{ver1} = (i01 - \text{mean})^2 + (i02 - \text{mean})^2 + (i11 - \text{mean})^2 + (i12 - \text{mean})^2$$

$$\text{ver2} = (i - \text{mean})^2 + (i11 - \text{mean})^2 + (i20 - \text{mean})^2 + (i21 - \text{mean})^2$$

$$\text{ver3} = (i11 - \text{mean})^2 + (i12 - \text{mean})^2 + (i21 - \text{mean})^2 + (i22 - \text{mean})^2 \quad (5)$$

In the above-described example, the neighboring block having the minimum value of the calculated values corresponding to the variances is selected as the neighboring block used in generating the high frequency component. As another selection method rather than selection of the neighboring block having the minimum value, for example, a method of associating a magnitude relation among the calculated values corresponding to the variances and the edge strength of the block in question with each other and selecting the neighboring block having the variance value associated based on the edge strength may also be adopted.

Edge strength E of the block in question is calculated according to the following expression (6) using the sub-band components LH0, HL0, and HH0 of the block in question as an example.

$$E=|LH0|+|HL0|+|HH0| \qquad (6)$$

FIG. 20A shows an example wherein an edge strength area of the block in question to be processed is divided into four areas according to the edge strength E calculated according to expression (6). An area 0 in FIG. 20A is an area where the edge strength E is the weakest in the edge strength to be processed. An area 3 in FIG. 20A is an area where the edge strength E is the strongest in the edge strength to be processed.

The high frequency component generation section 31 associates the edge strength areas of the block in question to be processed (area 0 to area 3) shown in FIG. 20A and the values, which are calculated using the expression (4) or (5) and correspond to variances of the neighboring blocks, with each other. Specifically, (i) the magnitude relation among the values, which are calculated using the expression (4) or (5) and which correspond to the variances of the neighboring blocks, and (ii) the edge strength areas of the block in question are associated with each other as shown in FIG. 20B. For example, if the edge strength E of the block in question is the strength belonging to area 3, the neighboring block having the maximum value is selected based on the calculated values corresponding to the variances of the neighboring blocks, as shown in FIG. 20B. Likewise, if the edge strength E of the block in question is the strength belonging to area 2, the neighboring block having the second largest value is selected. If the edge strength E of the block in question is the strength belonging to area 1, the neighboring block having the second smallest value is selected. If the edge strength E of the block in question is the strength belonging to area 0, the neighboring block having the minimum value is selected. By adopting such a selection method, it is made possible for the high frequency component generation section 31 to execute the process of generating the high frequency components corresponding to the edge strength of the block in question and the high frequency component generation section 31 can reproduce the feature of the input image with higher accuracy.

Figure 21:
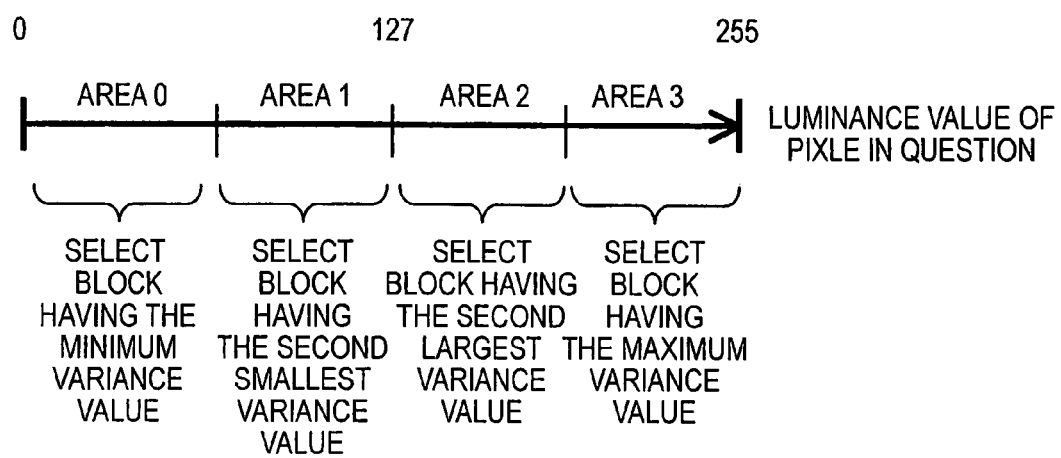
FIG. 21 is an explanatory view showing an example wherein luminance values of pixels in question of the block in question and calculated values corresponding to variances are associated with each other.

In the example described above, the edge strength E of the block in question and the calculated value corresponding to the variance are associated with each other. However, the luminance values of the pixels in question of the block in question and the calculated values corresponding to the variances may be associated with each other as shown in FIG. 21. In the example illustrated in FIG. 21, it is assumed that the luminance value is presented in eight-bit gray scale of 0 to 255. If the luminance value is in the range of 0 to 63, the neighboring block having the minimum value is selected. If the luminance value is in the range of 64 to 127, the neighboring block having the second smallest value is selected. If the luminance value is in the range of 128 to 191, the neighboring block having the second largest value is selected. If the luminance value is in the range of 192 to 255, the neighboring block having the maximum value is selected. This is because the area having a large luminance value in the input image is often the surface of a subject having a large light reflection factor and because the neighboring block having a large calculated value corresponding to the variance may be selected.

Further, in the examples shown in FIGS. 20 and 21, the area is divided into the four areas. However, the invention is not limited thereto. For example, a technique of dividing the area into two areas and associating the divided areas and the maximum value and the minimum value of the values corresponding to the variances with each other may be adopted, for example. In short, any technique may be used so long as it is a technique of dynamically selecting the neighboring block required in generating the high frequency components, based on the calculated statistic and the block in question or a state of a pixel in question.

The image block inverse orthogonal transformation section 32 uses the block in question and the sub-band components [LH1, HL1, HH1], [LH2, HL2, HH2], [LH3, HL3, HH3], and [LH4, HL4, HH4] corresponding to the high frequency components of the block in question generated by the high frequency component generation section 31 as shown in FIG. 8A to execute inverse wavelet transform as shown in the following expression (7), and generates an enlarged image block for each block in question as shown in FIG. 8B.

$$a0=(a+LH1+HL1+HH1)/4$$

$$b0=(a+LH1-HL1-HH1)/4$$

$$c0=(a-LH1+HL1-HH1)/4$$

$$d0=(a-LH1-HL1+HH1)/4$$

$$a1=(b+LH2+HL2+HH2)/4$$

$$b1=(b+LH2-HL2-HH2)/4$$

$$c1=(b-LH2+HL2-HH2)/4$$

$$d1=(b-LH2-HL2+HH2)/4$$

$$a2=(c+LH3+HL3+HH3)/4$$

$$b2=(c+LH3-HL3-HH3)/4$$

$$c2=(c-LH3+HL3-HH3)/4$$

$$d2=(c-LH3-HL3+HH3)/4$$

$$a3=(d+LH4+HL4+HH4)/4$$

$$b3=(d+LH4-HL4-HH4)/4$$

$$c3=(d-LH4+HL4-HH4)/4$$

$$d3=(d-LH4-HL4+HH4)/4 \qquad (7)$$

As described above, the enlarged image block generation section 3 assumes that the high frequency components generated by executing the orthogonal transformation of the predetermined neighboring blocks are the high frequency components of the block in question, and executes the inverse orthogonal transformation using the block in question and the generated high frequency components to generate an enlarged image block for each block in question. Thereby, it is made possible to enlarge without losing the essential high frequency components of the block in question.

[Detailed Description of Enlarged Image Generation Section]

Next, the enlarged image generation section 4 will be described in more detail.

Figure 9:
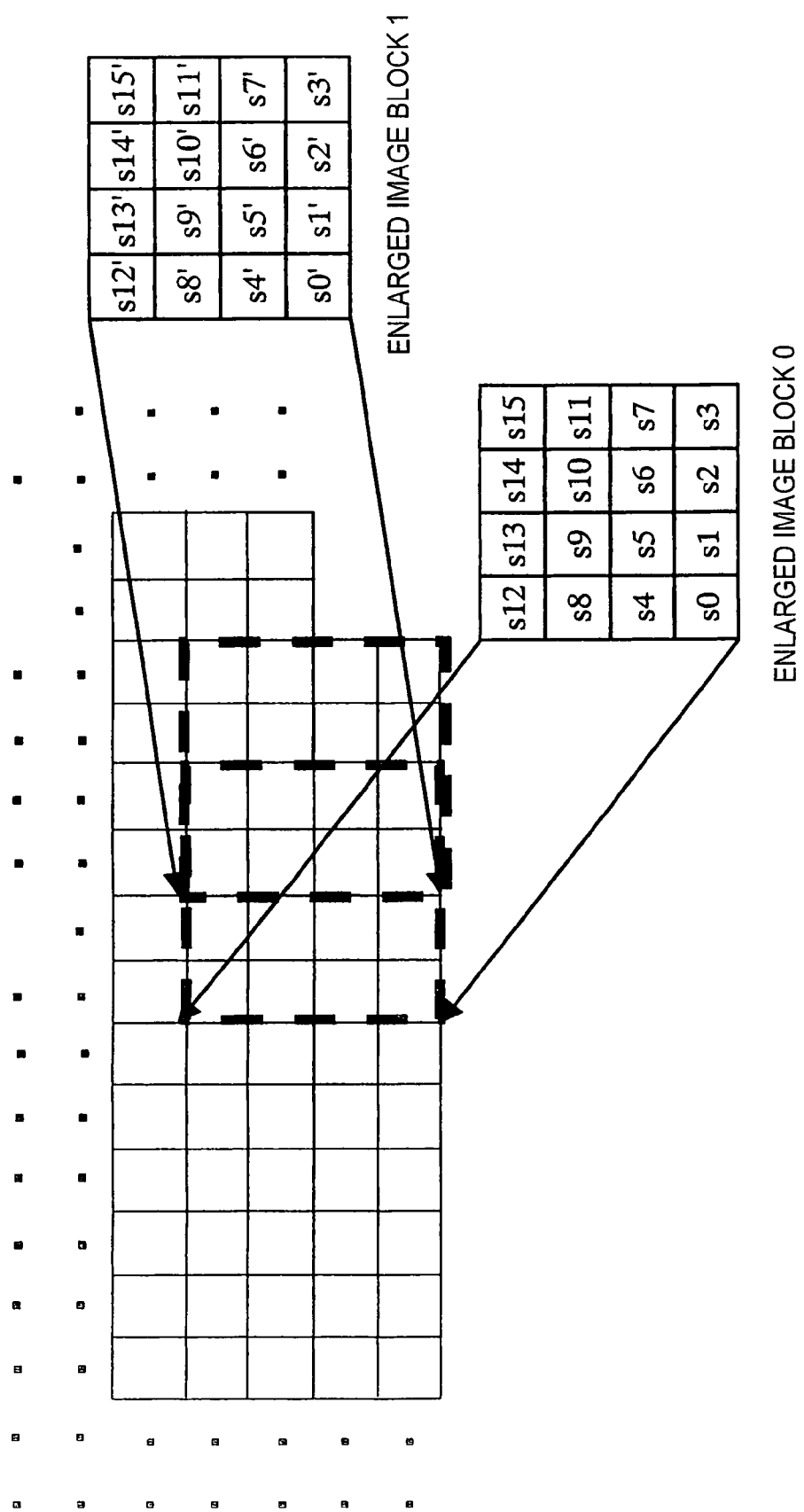
FIG. 9 is an explanatory view of a specific example of placing 4×4-pixel enlarged image blocks generated by an enlarged image block generation section.

The enlarged image generation section 4 places the enlarged image blocks for the blocks in question generated by the enlarged image block generation section 3 in order according to a predetermined method. FIG. 9 is an explanatory view of a specific example of placing 4×4 pixel enlarged image blocks generated by the enlarged image block generation section 3. In the example shown in FIG. 9, enlarged image blocks 0 and 1 generated in order are placed so that they overlap. Each overlap pixel is placed so that the value of the pixel and the preceding pixel value are averaged. Alternatively, the sum total of the overlap pixels may be calculated and the sum total of the pixel values may be divided by the number of the overlapping pixels, to thereby calculate each pixel value. In this case, the pixel in question is selected while one pixel is shifted at a time, and the enlargement process is performed. Alternatively, the blocks can also be arranged without the blocks overlapping. In this case, they may be selected so that the areas in question do not overlap.

Second Exemplary Embodiment

Figure 10:
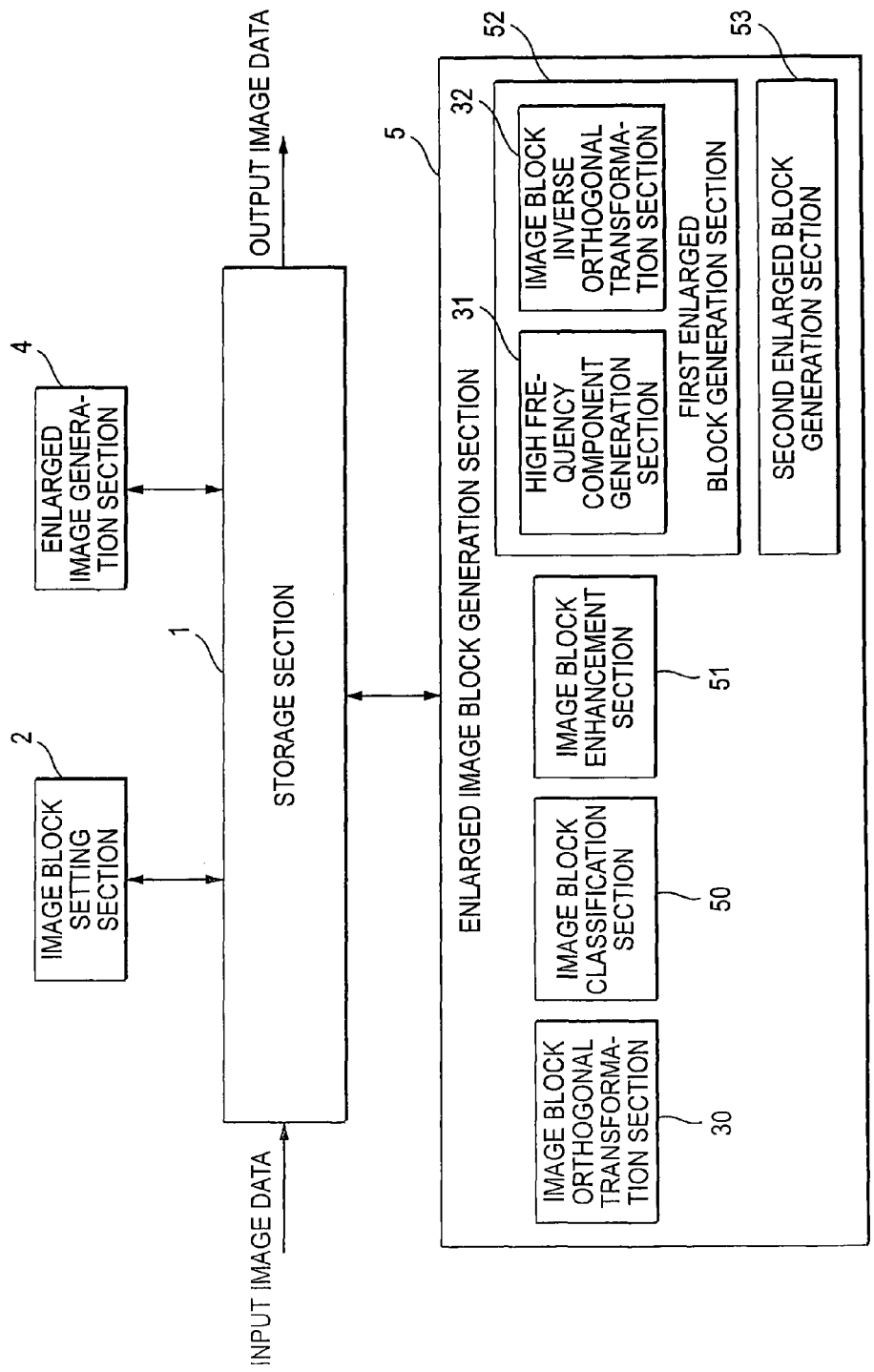
FIG. 10 is a block diagram showing one configuration example of an image processing system and an image processing method according to a second exemplary embodiment.

FIG. 10 is a block diagram showing an image processing system and an image processing method according to a second exemplary embodiment.

In FIG. 10, numeral 1 denotes a storage section, numeral 2 denotes an image block setting section, numeral 5 denotes an enlarged image block generation section, and numeral 4 denotes an enlarged image generation section. Further, numeral 30 denotes an image block orthogonal transformation section, numeral 31 denotes a high frequency component generation section, numeral 32 denotes an image block inverse orthogonal transformation section, numeral 50 denotes an image block classification section, numeral 51 denotes an image block enhancement section, numeral 52 denotes a first enlarged block generation section, and numeral 53 denotes a second enlarged block generation section.

The storage section 1, the image block setting section 2, the enlarged image generation section 4, the image block orthogonal transformation section 30, the high frequency component generation section 31, and the image block inverse orthogonal transformation section 32 are similar to those of the first exemplary embodiment previously described with reference to FIG. 1 and therefore will not be described again.

Figure 12:
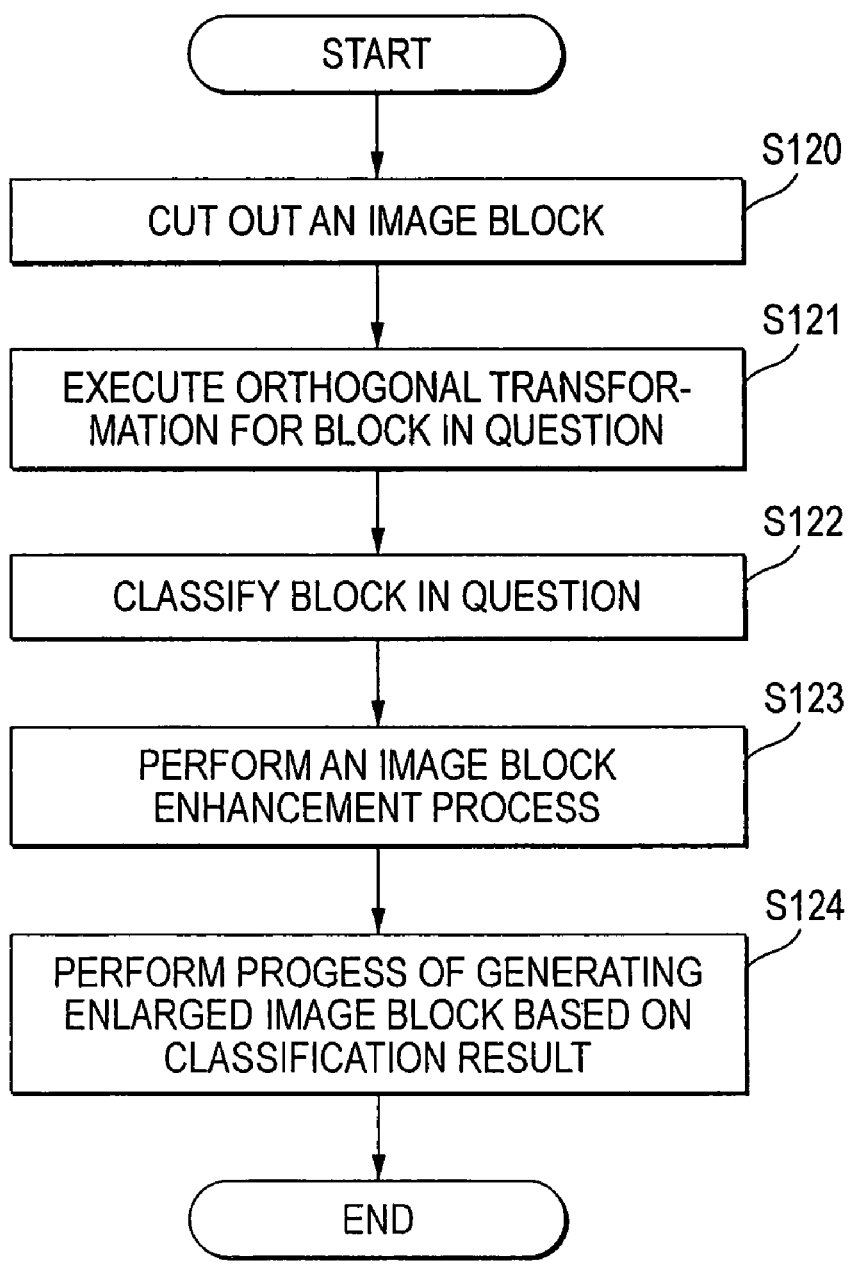
FIG. 12 is a flowchart to show a specific example of an operation of the image processing system according to the second exemplary embodiment of the invention.

A specific example of the operation of the image processing system according to the second exemplary embodiment illustrated in FIG. 10 will be described with reference to xa flowchart of FIG. 12.

At step S120, the image block setting section 2 cuts out an image block which has a predetermined size and which contains a block in question, and outputs the image block to the enlarged image block generation section 5.

At step S121, the image block orthogonal transformation section 30 executes orthogonal transformation for the block in question which has a predetermined size and which is contained in the image block output from the image block setting section 2, and break down the block in question into sub-band components LL, LH, HL, and HH.

At step S122, the image block classification section 50 classifies the block in question according to a predetermined criterion, using the sub-band components of the block in question provided by the image block orthogonal transformation section 30. More specifically, the image block classification section 50 determines as to whether the block in question is a block containing an edge or a block containing a texture which is made up of fine asperities rather than an edge, and classifies the block in question.

At step S123, the image block enhancement section 51 performs one of plural different contrast enhancement processes for each of the block in questions classified by the image block classification section 50, in accordance with the classification result.

At step S124, the first enlarged block generation section 52 performs an enlarged image block generation process for a block in question which the image block classification section 50 determines as a block containing texture, to generate an enlarged image block of the block in question. The second enlarged block generation section 53 performs an enlarged image block generation process for a block in question which image block classification section 50 determines as a block containing an edge, to generate an enlarged image block of the block in question. Then, the enlarged image generation section 4 places the enlarged image blocks generated by the first enlarged block generation section 52 and the second enlarged block generation section 53. The placement method is similar to that of the enlarged image generation section 4 in the first exemplary embodiment described above.

Next, the image block classification section 50, the image block enhancement section 51, the first enlarged block generation section 52, and the second enlarged block generation section 53 will be described in more detail.

The image block classification section 50 classifies the blocks in question based on an image feature amount. "Classifying image blocks" means classifying image blocks into distinctive image blocks (for example, an image block containing an edge, etc.,) and less distinctive image blocks (for example, an image block with small pixel value change, etc.). More specifically, each of the absolute values |LH|, |HL|, and |HH| of the sub-band components LH, HL, and HH of the block in question subjected to the orthogonal transformation according to the expression (1) by the image block orthogonal transformation section 30 is compared with a predetermined reference value TH2. If anyone of the absolute values of the three sub-band components is larger than the reference value TH2, the block in question is determined as a block containing an edge (which will be hereinafter referred to as an "edge block"). If all of the absolute values of the three sub-band components are smaller than the reference value TH2, the block in question is determined as a block containing texture (which will be hereinafter referred to as a "texture block").

The image block enhancement section 51 performs a contrast enhancement process based on the image block classification result by the image block classification section 50 described above, for the image block containing the block in question output from the image block setting section 2.

FIG. 11 is a drawing to illustrate enhancement kernels 533 (contrast enhancement kernels) used in the image block enhancement section 51.

As illustrated in FIG. 11, a first enhancement kernel 533a enhances contrast using weighting coefficients "1.80" and "−0.20" and a second enhancement kernel 533b enhances contrast using weighting coefficients "1.20" and "−0.05." The enhancement kernels are associated with the classification results of the image block classification section 50 and perform the contrast enhancement process using different weighting coefficients.

Figure 11B:
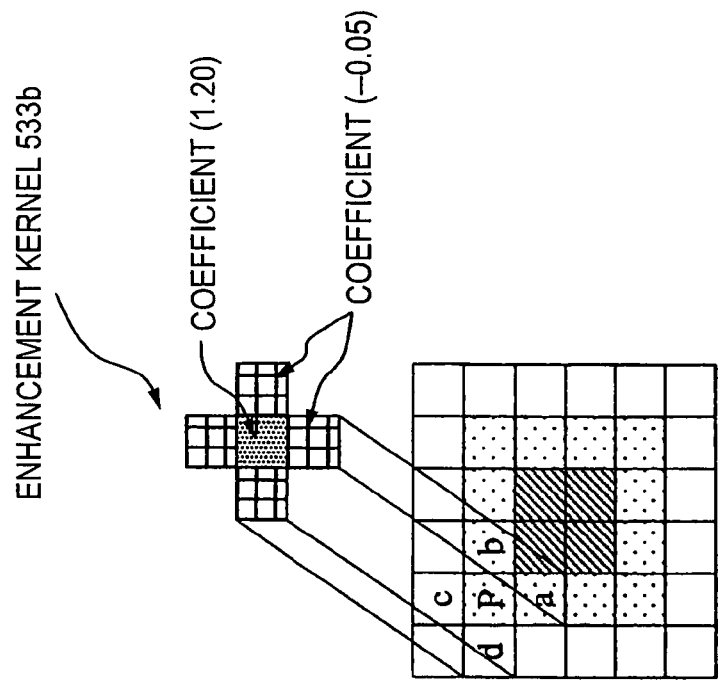
FIGS. 11A-11B is a drawing to illustrate enhancement kernels used in an image block enhancement section.
Figure 11A:
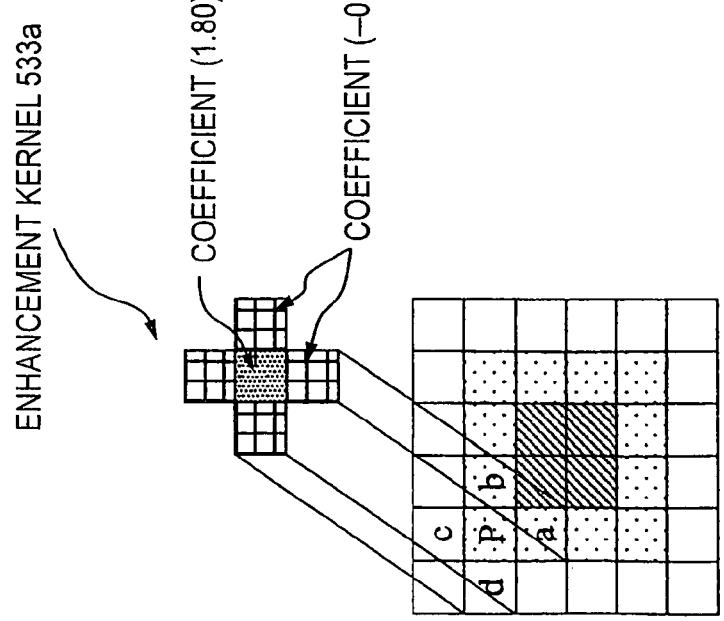

Specifically, the first enhancement kernel 533a shown in FIG. 11A is used in the contrast enhancement process for the image block containing the block in question classified as an edge block. The enhancement kernel having the larger weighting coefficients is thus associated with the edge block, to thereby reproduce a clearer and sharper edge.

The second enhancement kernel 533b shown in FIG. 11B is used in the contrast enhancement process for the image block containing the block in question classified as a texture block. The enhancement kernel having the smaller weighting coefficients than those for the edge block is thus associated with the texture block, to thereby render texture conspicuous and to improve the reproducibility of the texture. Further, image surface roughness caused by excessive enhancement of the texture can also be suppressed.

The first enhancement kernel 533*a* or the second enhancement kernel 533*b* refers to a pixel a just below a pixel P in question, a pixel b at the right of the pixel P, a pixel c just above the pixel P, and a pixel d at the left of the pixel P, multiplies the pixel values of these pixels by the weighting coefficient (−0.20) or (−0.05), adds the result to the pixel value of the pixel P in question, which is multiplied by the weighting coefficient (1.80) or (1.20), and adopts the resultant value as a pixel value of the pixel P in question, as illustrated in FIG. 11.

For example, to apply the first enhancement kernel 533*a*, a pixel value P' after the contrast enhancement is calculated according to the following expression (8).

$$(\text{Pixel value } P')=1.80\times P-0.20\times(a+b+c+d) \quad (8)$$

The weighting coefficients are not limited to those illustrated in FIGS. 11A and 11B. The pixel positions referred to are not limited to the top, bottom, left, right as shown in FIG. 11. The weighting coefficients and the pixel positions referred to may be changed appropriately according to the type, the size of the image data to be processed in such a manner that a pixel in a slanting direction is referenced and contrast enhancement is executed or that a pixel at a distance is referenced and contrast enhancement is executed, for example.

The first enlarged block generation section 52 including the high frequency component generation section 31 and the image block inverse orthogonal transformation section 32. The first enlarged block generation section 52 assumes that the high frequency components generated by executing the orthogonal transformation for predetermined neighboring blocks are the high frequency components of the block in question, and executes an inverse orthogonal transformation using the block in question and the generated high frequency components, to thereby perform the process of generating the enlarged image with keeping the essential high frequency components of the block in question, as described above in the first exemplary embodiment.

In the second exemplary embodiment illustrated in FIG. 10, the first enlarged block generation section 52 performs the process of generating the enlarged image block, for the block in question determined a texture block in the image block classification section 50.

The second enlarged block generation section 53 performs the process of generating the enlarged image block for the block in question determined as an edge block. The process includes calculating feature amounts, such as an edge strength of the block in question, an edge direction of the block in question, a pixel value pattern of the block in question, and generating the enlarged image block with suppressing occurrence of jaggies and a highly sharp edge. For example, technique disclosed in Japanese Patent No. 3915563 (corresponding to US 2003/0179935 A) may be used to implement the second enlarged block generation section 53.

Figure 13:
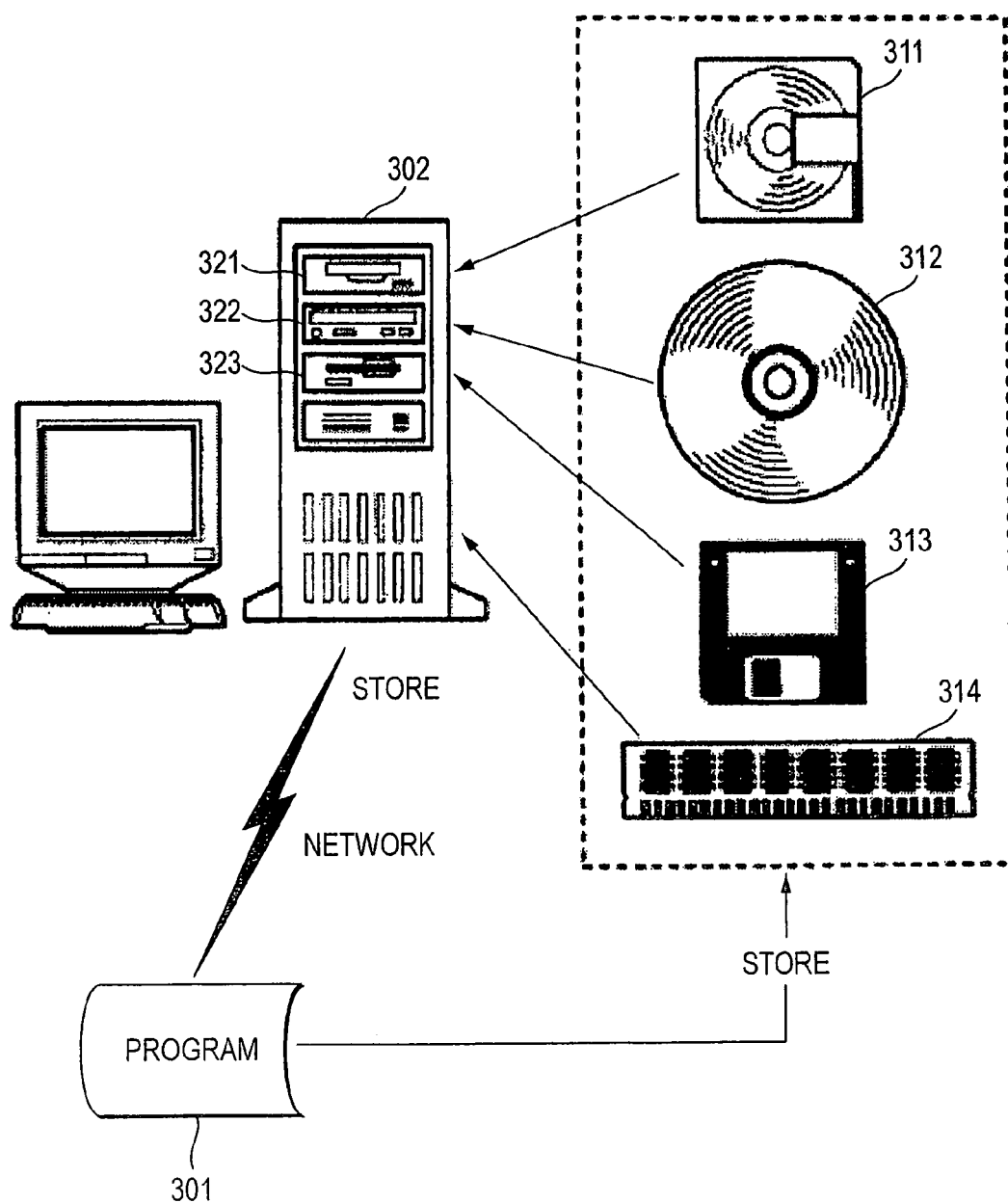
FIG. 13 is an explanatory view of an example of a computer program and a storage medium storing the computer program when functions of the image processing system or the image processing method is implemented as the computer program.

FIG. 13 is an explanatory view of an example of a computer program and a storage medium storing the computer program when the function of the image processing system or the image processing method is implemented as the computer program. In the figure, numeral 301 denotes a program, numeral 302 denotes a computer, numeral 311 denotes a magneto-optical disk, numeral 312 denotes an optical disk, numeral 313 denotes a magnetic disk, numeral 314 denotes memory, numeral 321 denotes a magneto-optical disk unit, numeral 322 denotes an optical disk unit, and numeral 323 denotes a magnetic disk unit.

The image processing functions described above in the embodiments can be implemented as the program 301 that can be executed by a computer. In this case, the program 301, the data used by the program, and the like can also be stored in a computer-readable storage medium. The storage medium is a medium that can cause a change state of energy of magnetism, light, electricity, etc., to occur in a reader included in the hardware resources of the computer in response to the description of the program and can transfer the description of the program to the reader in the format of the signal corresponding to the change state. For example, the storage medium is the magneto-optical disk 311, the optical disk 312 (containing a CD, a DVD, etc.), the magnetic disk 313, the memory 314 (containing an IC card, a memory card, etc.), etc. Of course, the storage media are not limited to portable media.

The program 301 is stored in any of the storage media and is placed in the magneto-optical disk unit 321, the optical disk unit 322, the magnetic disk unit 323, or a memory slot (not shown) of the computer 302, for example, whereby the program 301 can be read from the computer 302 for executing the function of the image processing system or the image processing method. Alternatively, a storage medium may be previously placed in the computer 302 and the program 301 may be transferred to the computer 302 through a network, etc., for example, and may be stored in the storage medium for execution. Memory in the computer 302, an attached magnetic disk unit, or any other storage medium can be applied to the storage section 1. Of course, some functions of the embodiment can also be implemented as hardware or all may be implemented as hardware.

Figure 14:
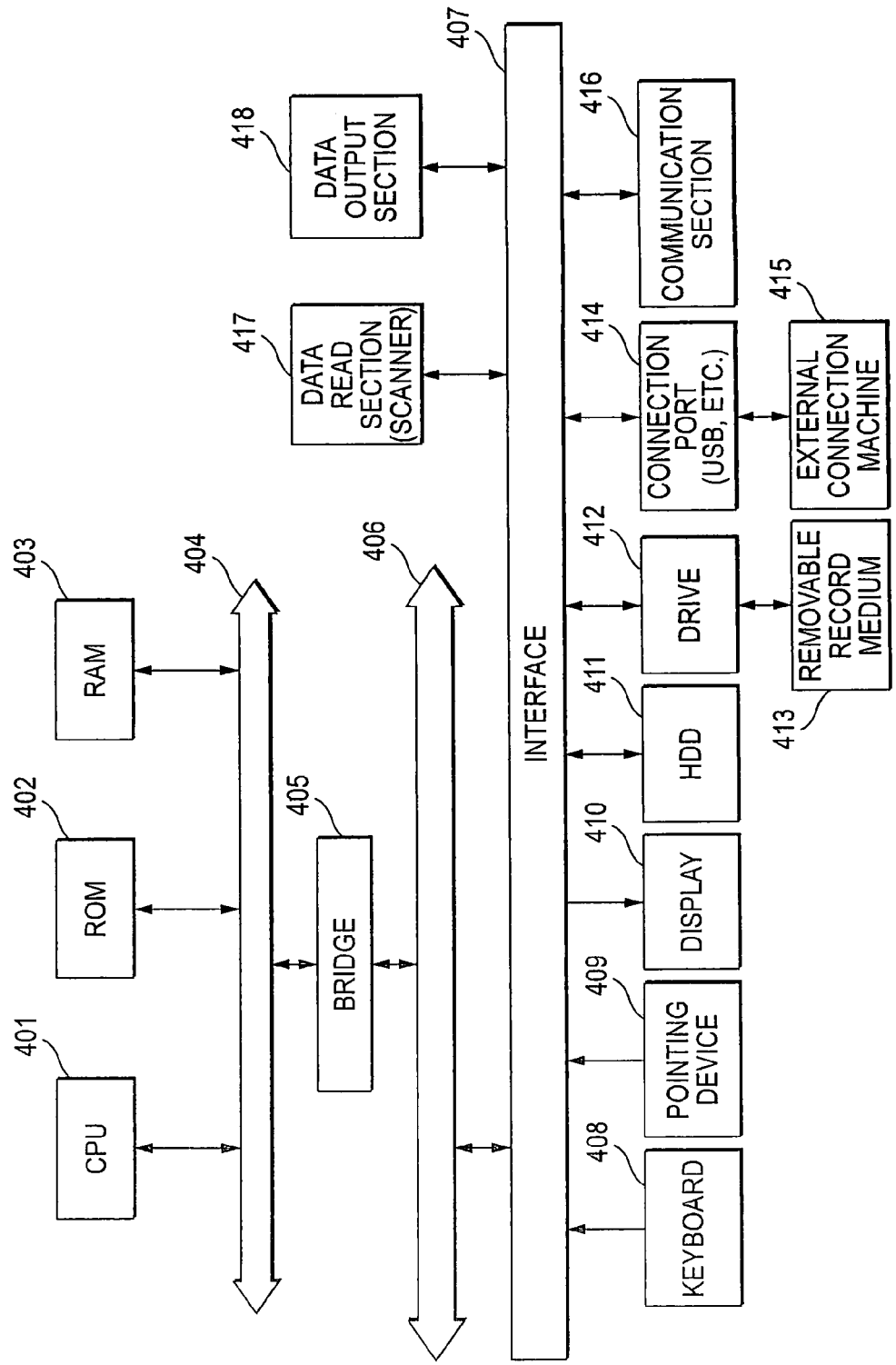
FIG. 14 is an explanatory view of a hardware configuration example of the computer for implementing the functions of the image processing system or the image processing method.

A hardware configuration example of the computer 302 for implementing the function of the image processing system or the image processing method of the embodiment will be described with reference to FIG. 14. The configuration shown in FIG. 14 is a hardware configuration example of a system implemented as a personal computer (PC), etc., and including an image data read section 417 such as a scanner and a data output section 418 such as a printer.

A CPU (Central Processing Unit) 401 is a control section for executing processing following a computer program describing an execution sequence of the various components described above in the embodiments, namely, the various components of the image block setting section 2, the enlarged image block generation section 3, 5, etc.

ROM (Read-Only Memory) 402 stores programs, operation parameters, etc., used by the CPU 401. RAM (Random Access Memory) 403 stores programs used in execution of the CPU 401, parameters changing appropriately in the execution of the CPU 401, and the like. They are connected by a host bus 404 implemented as a CPU bus, etc.

The host bus 404 is connected to an external bus 406 such as a PCI (Peripheral Component Interconnect/Interface) bus through a bridge 405.

A keyboard 408 and a pointing device 409 such as a mouse are input devices operated by the operator. A display 410 is implemented as a liquid crystal display, a CRT (Cathode Ray Tube), or the like for displaying various pieces of information as text and image information.

An HDD (Hard Disk Drive) 411 contains a hard disk and drives the hard disk for recording or playing back a program and information executed by the CPU 401. The hard disk stores an input image, an image subjected to enlargement process, etc. Further, the hard disk stores various computer programs such as various data processing programs.

A drive 412 reads data or a program recorded on a mounted removable record medium 413 such as a magnetic disk, an optical disk, a magneto-optical disk, or semiconductor memory, and supplies the data or the program to the RAM 403 connected through the interface 407, the external bus 406, the bridge 405, and the host bus 404. The removable record medium 413 can also be used as a data record area like a hard disk.

A connection port 414 is a port for connecting an external connection machine 415 and has a connection section of a USB, IEEE 1394, etc. The connection port 414 is connected to the CPU 401, etc., through the interface 407, the external bus 406, the bridge 405, the host bus 404, etc. A communication section 416 is connected to a network for executing data communication processing with an external system. A data read section 417 is, for example, a scanner and executes document read processing. A data output section 418 is, for example, a printer and executes document data output processing.

The hardware configuration of the system shown in FIG. 14 shows one system example and the embodiments are not limited to the configuration shown in FIG. 14 and may have any configuration if the components described in the embodiments can be executed. For example, some components may be implemented as dedicated hardware (for example, ASIC, etc.,) and some components may be in a mode in which they exist in an external system and are connected via a communication line and further a plurality of the systems shown in FIG. 14 may be connected to each other by a communication line for performing coordinated operation. The system may be built in a copier, a fax, a scanner, a printer, a multifunction processing machine (also called a multifunction copier, having the functions of a scanner, a printer, a copier, a fax, etc.), or the like.

The program described above may be stored in a computer recording medium. In such a case, the computer readable medium may be configured as follows.

A computer readable medium stores a program causing a computer to execute image processing. The image processing includes:

converting neighboring areas of each area in question into a plurality of frequency components, wherein the areas in question and the neighboring areas of the areas in question are included in an input image;

generating predetermined frequency components from the frequency components of each neighboring area; generating an enlarged image area for each area in question, using (i) an image region which contains each area in question and which has a predetermined size and (ii) the predetermined frequency components; and placing the generated enlarged image areas to generate an enlarged image for the input image.

A computer readable medium stores a program causing a computer to execute image processing. The image processing includes:

converting each area in question and neighboring areas of each area in question into a plurality of frequency components, wherein the areas in question and the neighboring areas of the areas in question are included in an input image;

classifying each area in question;
enhancing each area in question;
generating predetermined frequency components from the frequency components of each neighboring area;

(a) generating an enlarged image area for each area in question, using (i) an image region which contains each area in question and which has a predetermined size and (ii) the predetermined frequency components generated by the frequency component generation section;

(b) generating an enlarged image area for each area in question by a different technique from that of the (a) generating; and placing the enlarged image areas generated by the (a) generating and the (b) generating to generate an enlarged image for the input image.

The expression "computer-readable record medium recording a program" is used to mean a record medium that records a program and can be read by a computer, used to install and execute a program, to distribute a program, etc.

The record media include "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), magneto-optical disk, flexible disk (FD), magnetic tape, hard disk, read-only memory (ROM), electrically erasable and programmable read-only memory (EEPROM), flash memory, random access memory (RAM), etc., for example.

The described program or a part thereof can be recorded in any of the described record media for retention, distribution, etc. The described program or a part thereof can also be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and can also be carried over a carrier wave.

Further, the described program may be a part of another program or may be recorded in a record medium together with a different program.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
    a frequency conversion section that converts neighboring areas of each area in question into a plurality of frequency components, wherein the areas in question and the neighboring areas of the areas in question are included in an input image;
    a frequency component generation section that generates predetermined frequency components from the frequency components of each neighboring area obtained by the frequency conversion section;
    an enlarged image area generation section that generates an enlarged image area for each area in question, using (i) an image region which contains each area in question and which has a predetermined size and (ii) the predetermined frequency components generated by the frequency component generation section; and an enlarged image generation section that places the enlarged image areas generated by the enlarged image area generation section to generate an enlarged image for the input image, wherein the enlarged image area generation section executes inverse wavelet transform for (i) the image region which contains each area in question and (ii) the predetermined frequency components generated by the frequency component generation section.

2. The system according to claim 1, wherein the frequency conversion section executes wavelet transform to converts the neighboring areas of each area in question into the plurality of frequency components.

3. The system according to claim 1, wherein the neighboring areas of each area in question are located in predetermined positions with respect to each area in question.

4. The system according to claim 1, wherein:
the frequency component generation section generates the predetermined frequency components from the neighboring areas of each area in question, and
the neighboring area of each area in question are selected based on a feature of each area in question.

5. The system according to claim 4, wherein the frequency component generation section calculates an edge direction of each area in question as the feature of each area in question.

6. An image processing system comprising:
a frequency conversion section that converts neighboring areas of each area in question into a plurality of frequency components, wherein the areas in question and the neighboring areas of the areas in question are included in an input image;
a frequency component generation section that generates predetermined frequency components from the frequency components of each neighboring area obtained by the frequency conversion section;
an enlarged image area generation section that generates an enlarged image area for each area in question, using (i) an image region which contains each area in question and which has a predetermined size and (ii) the predetermined frequency components generated by the frequency component generation section; and
an enlarged image generation section that places the enlarged image areas generated by the enlarged image area generation section to generate an enlarged image for the input image, wherein
the neighboring areas of each area in question are located in predetermined positions with respect to each area in question, and
the frequency component generation section stores, as position information in advance, positions of the plurality of neighboring areas that are based on an edge direction of each area in question and that are used in generating the high frequency components.

7. The system according to claim 3, wherein the frequency component generation section select a plurality of image areas that have strong correlation with a feature of each area in question, as the plurality of neighboring areas that are located in the predetermined positions and that are used in generating the high frequency components.

8. The system according to claim 1, wherein the frequency component generation section generates the predetermined frequency components from the neighboring areas of each area in question that are selected based on statistics of the neighboring areas.

9. An image processing system comprising:
a frequency conversion section that converts neighboring areas of each area in question into a plurality of frequency components, wherein the areas in question and the neighboring areas of the areas in question are included in an input image;
a frequency component generation section that generates predetermined frequency components from the frequency components of each neighboring area obtained by the frequency conversion section;
an enlarged image area generation section that generates an enlarged image area for each area in question, using (i) an image region which contains each area in question and which has a predetermined size and (ii) the predetermined frequency components generated by the frequency component generation section; and
an enlarged image generation section that places the enlarged image areas generated by the enlarged image area generation section to generate an enlarged image for the input image, wherein
the frequency component generation section generates the predetermined frequency components from the neighboring areas of each area in question that are selected based on statistics of the neighboring areas, and
the frequency component generation section generates the predetermined frequency components from the neighboring areas of each area in question that are selected based on statistics of the neighboring areas
the frequency component generation section uses a deviation that is a sum of differences between pixels in each neighboring area and an average value of the pixels of each neighboring area as the statistic of each neighboring area, to generate the frequency components from the neighboring areas that are selected based on the deviations.

10. The system according to claim 8, wherein the frequency component generation section uses a variance of the neighboring areas as the statistics of the neighboring areas, to generate the frequency components from the neighboring areas that are selected based on the variances.

11. The system according to claim 1, wherein the frequency component generation section calculates statistics of the plurality of neighboring areas, calculates an edge strength of each area in question as a feature of each area in question, selects an area having a predetermined statistic from among the plurality of neighboring areas based on the edge strength of each area in question, and generates the frequency components from the selected area.

12. The system according to claim 1, wherein the frequency component generation section calculates statistics of the plurality of neighboring areas, selects an area having a predetermined statistic from among the plurality of neighboring areas based on a pixel value of a predetermined pixel in each area in question, and generates the frequency components from the selected area.

13. The system according to claim 1, wherein the frequency component generation section generates the high frequency components from a neighboring area having a frequency component close to a high frequency component of each area in question.

14. The system according to claim 1, wherein when a high frequency component of each area in question is smaller than a predetermined reference value, the frequency component generation section sets a value of the generated high frequency component to be equal to 0.

15. The system according to claim 1, wherein the enlarged image generation section calculates a sum of pixel values of pixels of the enlarged image areas that overlap at each pixel of the enlarged image, and divides the sum of the pixel values by number of the overlapping enlarged image areas to calculate the pixel value of each pixel of the enlarged image.

16. The system according to claim 1, wherein the enlarged image generation section sequentially places the enlarged image areas generated in sequence so that the enlarged image areas don't overlap each other.

17. An image processing system comprising:
a frequency conversion section that converts each area in question and neighboring areas of each area in question into a plurality of frequency components, wherein the areas in question and the neighboring areas of the areas in question are included in an input image;
a classification section that classifies each area in question;
an enhancement section that enhances each area in question;
a frequency component generation section that generates predetermined frequency components from the frequency components of each neighboring area obtained by the frequency conversion section;
a first enlarged image area generation section that generates an enlarged image area for each area in question, using (i) an image region which contains each area in question and which has a predetermined size and (ii) the predetermined frequency components generated by the frequency component generation section;
a second enlarged image area generation section that generates an enlarged image area for each area in question by a different technique from that of the first enlarged image area generation section; and
an enlarged image generation section that places the enlarged image areas generated by the first enlarged image area generation section and the second enlarged image area generation section to generate an enlarged image for the input image.

18. The system according to claim 17, wherein the classification section classifies each area in question according to a value calculated based on the frequency components of each area in question.

19. The system according to claim 17, wherein the enhancement section enhances each area in question using an edge enhancement kernel having predetermined kernel elements and a distance between the kernel elements.

20. The system according to claim 17, wherein the enhancement section enhances each area in question using an edge enhancement kernel, which is selected from among a plurality of different edge enhancement kernel based on a classification result of each area in question by the classification section.

21. The system according to claim 17, wherein:
the first enlarged image area generation section generates the enlarged image area for each area in question, which is classified as a texture area by the classification section, and
the second enlarged image area generation section generates the enlarged image area for each area in question, which is classified as an edge area by the classification section.

22. The system according to claim 17, wherein:
the enhancement section enhances contrast of each area in question, which is classified as a texture area by the classification section,
the first enlarged image area generation section generates the enlarged image area for each area in question whose contrast is enhanced by the enhancement section, and
the second enlarged image area generation section generates the enlarged image area for each area in question, which is classified as an edge area by the classification section.

23. A non-transitory computer readable medium storing a computer readable program executable by a computer for causing the computer to execute image processing, the image processing comprising:
converting neighboring areas of each area in question into a plurality of frequency components, wherein the areas in question and the neighboring areas of the areas in question are included in an input image;
generating predetermined frequency components from the frequency components of each neighboring area;
generating an enlarged image area for each area in question, using (i) an image region which contains each area in question and which has a predetermined size and (ii) the predetermined frequency components; and
placing the generated enlarged image areas to generate an enlarged image for the input image, wherein
generating the enlarged image area for each area in question includes executing inverse wavelet transform for (i) the image region which contains each area in question and (ii) the generated predetermined frequency components.

24. A non-transitory computer readable medium storing a computer readable program executable by a computer for causing the computer to execute image processing, the image processing comprising:
converting each area in question and neighboring areas of each area in question into a plurality of frequency components, wherein the areas in question and the neighboring areas of the areas in question are included in an input image;
classifying each area in question;
enhancing each area in question;
generating predetermined frequency components from the frequency components of each neighboring area;
(a) generating an enlarged image area for each area in question, using (i) an image region which contains each area in question and which has a predetermined size and (ii) the predetermined frequency components generated by the frequency component generation section;
(b) generating an enlarged image area for each area in question by a different technique from that of the (a) generating; and
placing the enlarged image areas generated by the (a) generating and the (b) generating to generate an enlarged image for the input image.

* * * * *